EDWARDS M. BURCHARD.

Tea and Coffee Pot.

No. 121,326.  Patented Nov. 28, 1871.

Witnesses.  Inventor.

UNITED STATES PATENT OFFICE.

EDWARDS M. BURCHARD, OF WASHINGTON, DISTRICT OF COLUMBIA.

IMPROVEMENT IN TEA AND COFFEE POTS.

Specification forming part of Letters Patent No. 121,326, dated November 28, 1871.

*To all whom it may concern:*

Be it known that I, EDWARDS M. BURCHARD, of Washington city, in the county of Washington and in the District of Columbia, have invented certain new and useful Improvements in Tea and Coffee Pots; and do hereby declare that the following is a full, clear, and exact description thereof, reference being had to the accompanying drawing making a part of this specification, in which—

Figure 1:
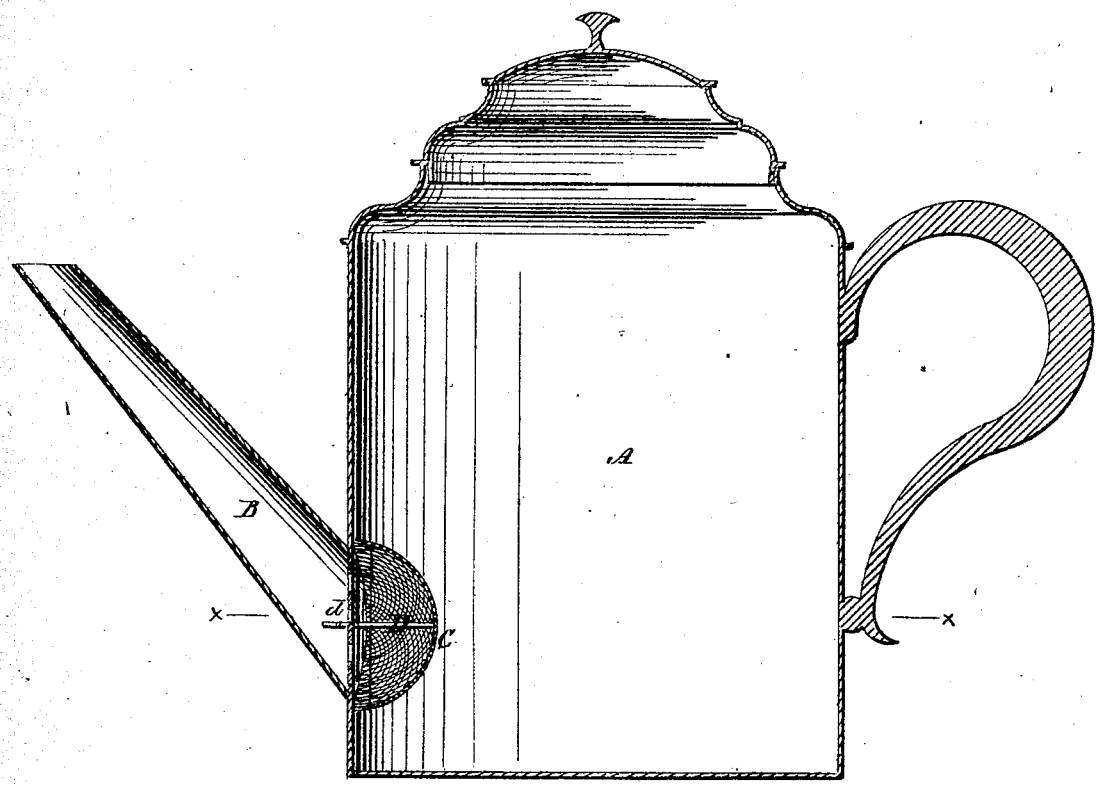
Figure 2:
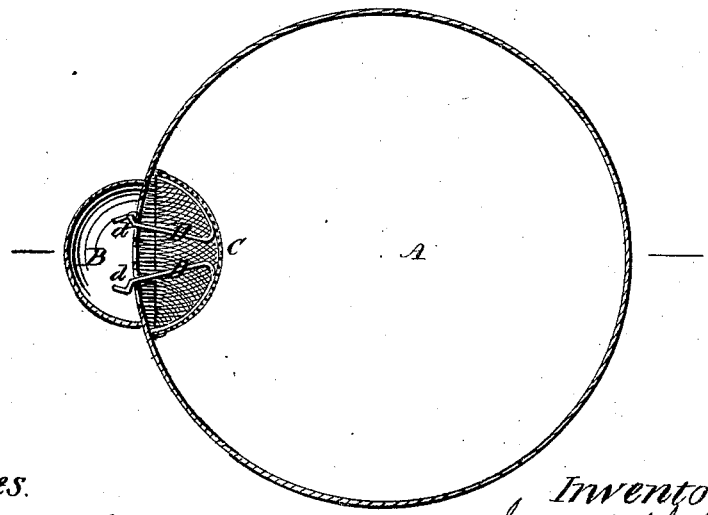

Figure 1 is a vertical central section of a coffee or tea pot having attached thereto my straining device, and Fig. 2 is a horizontal section of the same on the line $x\ x$ of Fig. 1.

Letters of like name and kind refer to like parts in each of the figures.

The object of my invention is to furnish a simple, efficient, and cheap means for separating the solid and liquid portions of tea or coffee; and it consists principally in a convex metal strainer attached to or upon the inner end of the discharge-spout, substantially as and for the purpose hereinafter specified. It consists, further, in the means employed for attaching the strainer to or upon the spout, substantially as is hereinafter shown.

In the annexed drawing, A represents a pot for containing tea or coffee, having a discharge-spout, B, all of usual construction. Fitted upon the inner side of the pot A, immediately over the lower inner end of the spout B, is a strainer, C, constructed of reticulated sheet metal, wire-gauze, or other suitable material, in the form shown, (the same being that of a hemisphere,) with its convex side inward or toward the center of the pot. As thus constructed the strainer is secured in place by any suitable means, and from its peculiar shape, not only affords a much larger surface to the liquid than would otherwise be possible, but also effectually prevents the lodgment of solid matter upon or against its inner side and the consequent obstruction of its openings. In order that the strainer may be detached, when desired, for the purpose of cleansing the same, two springs, D, are attached to its inner side and, extending outward and apart, are each provided with an outward offset, $d$, which, when said strainer is in place, would pass just outside of the wall of the pot. In applying the strainer thus provided with locking-springs the forward ends of the latter are pressed together until they will pass into the inner end of the spout, when, by their outward spring, the shoulders are forced behind the projecting edge of the opening in the wall of the pot and firmly lock the strainer in position.

The special advantages possessed by this construction and attachment of the strainer are that the outward flow of the liquid is but slightly interrupted, the openings in the strainer are not liable to obstruction, and the strainer and pot can be easily separated and quickly cleansed.

Having thus fully set forth the nature and merits of my invention, what I claim as new is—

1. In combination with the inner end of the discharge-spout of a tea or coffee pot, the strainer C, provided with locking-springs D for the purpose of retaining the same in position, substantially as set forth.

2. As a new article of manufacture, a semi-spherical metal strainer, C, provided with locking-springs D, substantially as and for the purpose shown.

In testimony that I claim the foregoing I have hereunto set my hand this 21st day of October, 1871.

EDWARDS M. BURCHARD.

Witnesses:
GEO. S. PRINDLE,
JOHN R. YOUNG.            (136)